United States Patent [19]

Mass et al.

[11] 4,046,718
[45] Sept. 6, 1977

[54] POLYMERIZATION METHOD EMPLOYING TUBULAR REACTOR

[75] Inventors: Robert O. Mass, Midland; Donald L. Tomkinson, Bay City, both of Mich.

[73] Assignee: The Dow Chemical Company, Midland, Mich.

[21] Appl. No.: 696,954

[22] Filed: June 17, 1976

[51] Int. Cl.² ............................................. C08F 2/02
[52] U.S. Cl. .................................. 260/2 R; 260/2 A; 526/64; 526/79; 526/87
[58] Field of Search .............. 260/2 A, 2 R; 526/64, 526/79, 87

[56] References Cited

U.S. PATENT DOCUMENTS

| 3,414,499 | 12/1968 | Gardner et al. | 526/64 |
| 3,560,460 | 2/1971 | Gilbert | 526/64 |
| 3,714,123 | 1/1973 | Mancini et al. | 526/64 |
| 3,719,643 | 3/1973 | Knight | 526/64 |
| 3,879,357 | 4/1975 | Wingler et al. | 526/64 |

Primary Examiner—Alan Holler
Attorney, Agent, or Firm—R. B. Ingraham

[57] ABSTRACT

Reliable continual preparation of polymers is obtained using a tubular reactor by intermittently feeding monomer, permitting substantial polymerization, adding additional monomer to displace a portion of the polymer formed and repeating the foregoing cycle. Plugging of the reactor is avoided.

6 Claims, 2 Drawing Figures

POLYMERIZATION METHOD EMPLOYING TUBULAR REACTOR

For many years tubular reactors have been considered highly desirable for the conversion of monomeric materials to polymers and particularly theromplastic polymers. Tubular reactors generally provide low initial cost, offer the possibility of high heat transfer and are readily fabricated from pipe or tubing. Such tubular reactors have been successfully employed for continuous polymerizations where the conversion of monomer to polymer is low, or a large quantity of solvent is present or in instances where the polymerization reaction is conducted at temperatures well above the melt temperature of the polymer being produced. Particularly desirable polymerizations usually are those in which monomer and little, if any, solvent is passed through a tubular reactor and a high proportion of the monomer, for example, greater than 95 percent is converted to polymer is a single pass. In many instances, in the preparation of thermoplastic polymers, it is desired to conduct the polymerization at a temperature below the melt temperature of the polymer. Generally when this is attempted in a tubular reactor by pumping a monomeric stream continuously through the reactor, there is a gradual growth of polymer on the inner walls. The polymer deposit effectively reduces the heat transfer capability and the effective volume of the reactor. Generally when such a reactor is used to prepare a polymer using temperatures below the melt temperature of the polymer, conversion gradually decreases with time, the pressure drop across the reactor increases, and finally the reactor plugs. A wide variety of reactors have been designed to overcome such problems, many of them employing mechanical agitation to increase heat transfer and reduce the tendency of the reactor to plug. Others have employed scraping arrangements such as screws to displace material lying near the vessel wall. Some polymerization reactors are disclosed in the following U.S. Pat. Nos. 2,714,101; 2,769,804; 2,989,517; 3,040,013; 3,451,986; 3,495,951; 3,544,522; and 3,747,899.

It would be desirable if there were available an improved method for polymerization in a tubular reactor.

It would also be desirable if there were available an improved method for the polymerization of organic monomers to polymers in a tubular reactor wherein desirable heat transfer were maintained and the tendency toward plugging reduced.

It would also be desirable if there were available a method for polymerization in a tubular reactor which required a minimal quantity of equipment. These benefits and other advantages in accordance with the present invention are achieved in a method for the polymerization of an organic monomeric material to a synthetic resinous thermoplastic polymer, the polymer being soluble in the monomeric material, advantageously in certain instances the polymerization being carried out at a temperature below the melt temperature of the polymer, the steps of the method comprising passing the monomeric material into an inlet of an elongate unstirred tubular reactor maintaining the monomeric material within the tubular reactor at a temperature sufficient to induce polymerization of at least a portion of the monomer to form polymer, discharging and recovering polymerized thermoplastic material from the tubular reactor, the improvement which comprises intermittently feeding monomer material to the reactor in quantities not greater than 0.5 reactor volume converting at least 50 percent of the monomer introduced to polymer prior to discharge from the reactor subsequently introducing additional monomer.

Further features and advantages of the invention will become more apparent from the following specification taken in connection with the Drawing wherein.

Figure 1:
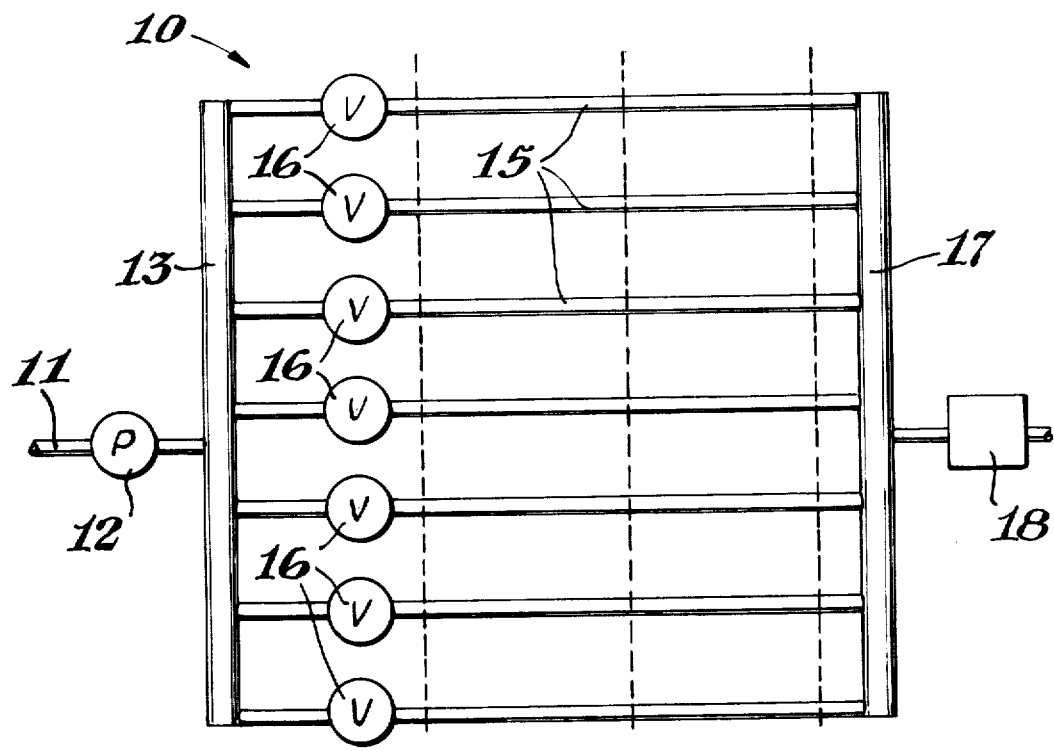
FIG. 1 is a schematic representation of a multiple tubular reactor in accordance with the present invention.

In FIG. 1 there is schematically depicted a multiple tubular reactor generally designated by the reference numeral 10. The reactor 10 is suitable for the practice of the method of the present invention. The reactor 10 comprises in cooperative combination a monomer supply means or conduit 11. The conduit 11 has disposed therein a forwarding means or pump 12. The conduit 11 is in communication with a header 13. The header 13 is in communication with a plurality of tubular reactors 15. The tubular reactors 15 each have disposed therein a valve 16 adjacent the header 13. The dotted lines of FIG. 1 schematically define temperature control zones. Each of the reactors 15 remote from the header 13 communicates with a discharge header 17. The header 17, in turn, is in communication with a polymer processing means 18. The processing means 18 may be as simple as a die or may be a devolatilizer in combination with polymer cooler, extruder, strand die, pelletizer, and the like.

In employing the apparatus 10 of FIG. 1 for the practice of the method of the present invention, monomeric material to be polymerized is forwarded by the pump 12 to the header 13 in a continuous manner. The valves 16 are sequentially opened and closed in such a manner that each of the valves is open one-seventh of the time thereby providing intermittent flow in the tubular reactors 15 and continuous flow in the conduit 11. The quantity of material provided by the pump 12 is such that during the period when any valve is open only a portion of the material within the associated reactor is displaced, for example, 25 percent of the volume of the reactor might be added. The time period for the complete sequence for all of the valves to open and close in selected such that substantial conversion of the monomer to polymer in a tubular reactor 15 occurs. Thus, a continuous supply of polymer is passed to the header 17 and the processing means 18.

Figure 2:
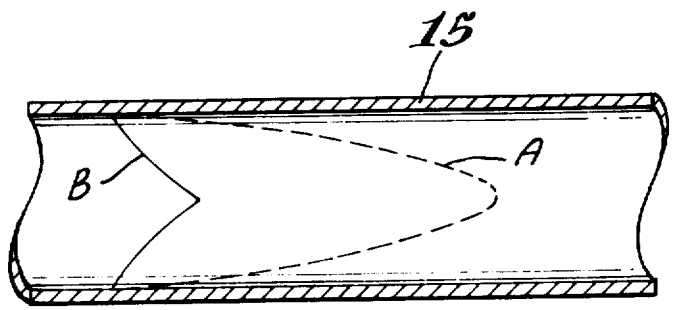
FIG. 2 is a schematic representation of polymer and monomer interfaces in a reactor such as the reactor in FIG. 1.

In FIG. 2 there is schematically depicted a foreshortened representation of monomer-polymer interfaces in a tubular reactor such as the reactor 15. As the polymer is soluble in the monomer, it must be realized that the interfaces are not as sharp and distinct as might be indicated by the lines in the Drawing. The dotted line A represents an interface between the monomer and polymer which is believed to exist immediately after introduction of monomer into the tubular reactor. The solid line B represents the interface between the monomer and the polymer immediately prior to the introduction of monomer. The term "polymer" as used in reference to FIG. 2 means a highly viscous body of polymer which may contain a substantial portion of monomer, solvent or solvent and monomer. The viscous body of polymer does not readily or rapidly diffuse into monomer or solvent and monomer without agitation.

The process of the present invention can be employed with benefit to polymerize any monomer or mixture of monomers with or without an additional solvent in which the polymer is soluble in the stream being polymerized. Such systems are well known and include styrene-polystyrene, methyl methacrylate-polymethyl methacrylate, 2-ethyl oxazoline-poly-2-ethyl oxazoline, tertiarybutyl styrene, polytertiarybutyl styrene, α-methyl styrene, poly-α-methyl styrene, chlorostyrene, polychlorostyrene, isoprene, polyisoprene, vinyltoluene, polyvinyltoluene, butadiene, polybutadiene, ethylene oxide, polyethylene oxide, and the like.

The method of the present invention is particularly advantageous and desirable for monomers which polymerize rapidly and exhibit a large polymerization exotherm. In essence, the method provides what approaches a plurality of sequential intermittent batch reactions; however, if desired, the inherent amount of back mixing can be increased by the use of flow invertors, interfacial surface generators, static pipeline mixers, turbulators or the like, placed within the tubular reactor. Such devices are well known and one or more of such devices are shown and described in each of the following U.S. Pat. Nos. 2,852,042; 3,051,452; 3,051,453; 3,128,794; 3,195,865; 3,239,197; 3,620,506, 3,652,061; and 3,794,300.

Generally for the practice of the method of the present invention wherein a monomer is being converted to a viscous polymer with a relatively rapid reaction rate, it is desirable to employ tubular reactors of a relatively small diameter, for example, a reactor having a diameter not greater than about 1 and ½ inches and beneficially not in excess of about 1 inch, in the case of reactors having a circular cross-section and without flow altering devices such as mixers or the like. Beneficially, when metal flow altering devices such as interfacial generators or static mixers are employed, the diameter of the reactor may be increased for any given polymerization system because of the increase in thermal conductivity from the center of the reactor to the reactor wall provided by the flow altering device. Often, it is desirable to add the monomeric stream to the reactor at a rate that is sufficiently low that streamline flow in the polymer occurs rather than turbulent flow. The method of the present invention can be employed to provide effluent streams which contain up to 100 percent polymer. Beneficially, in many applications it is desirable to dilute the polymerizable monomer with a solvent which is nonreactive under the conditions of polymerization. Oftentimes, the amount of solvent will range from 5 to 500 percent by weight of the polymer produced and beneficially from 0 to about 50 percent of the polymer.

By way of further illustration, a reactor was prepared which consisted of four sections of stainless steel tubing 7 feet long. The tubing had an inside diameter of 0.315 inch. Each section of the tubing had a 5 foot long oil-heated jacket. The four sections of tubing were connected in series and were preceded by a mixing zone and a 7 foot length of similar stainless steel tubing which was unheated and acted as a region in which the reactants could mix by diffusion before entering the reactor. The discharge end of the reactor was provided with a pneumatically operated control valve which was controlled by a signal from a pressure transducer immediately upstream of the discharge valve. An anhydrous solution of styrene in benzene was prepared and hot oil circulated through the jackets of the four reactor sections. The jackets were maintained at temperatures of 140° to 145° C. The reactor was immediately filled with benzene and the styrene-benzene mixture was intermittently pumped to the mixing zone and admixed with 0.039 molar n-butyl lithium. The reactor was maintained at a pressure of about 100 pounds per square inch gauge. The styrene-benzene solution containing n-butyl lithium was intermittently fed to the reactor for a period of 8 to 12 minutes using 4 to 9 minutes of flow at a rate of 1870 ml. per hour to 3 to 5 minutes of no-flow.

Employing the procedure as hereby described with variations in monomer-to-solvent ratio and catalyst concentration, polystyrenes with molecular weights of between about 100,000 and 600,000 were readily prepared without evidence of reactor plugging. When producing polystyrene of a molecular weight of about 600,000, the pressure limit of the feed pump was approached and no attempt was made to prepare polymers having a higher molecular weight. No evidence of build-up or fouling of the reactor walls was observed.

In a manner similar to the foregoing illustration, 2-ethyloxazoline was readily converted to poly-2-ethyloxazoline, when employing 0.04 to 0.3 percent by weight of paratoluene sulfonic acid catalyst and oil temperatures in the reactor jackets are 160° to 210° C. The feed was intermittently fed to the reactor for 1.4 minutes and discontinued for 2.8 minutes and the cycle repeated. About 100 percent conversion of the 2-ethyloxazoline to polymer was obtained. By varying polymerization temperatures and catalyst concentrations poly-2-ethyloxazoline having molecular weights of about 100,000 to about 450,000 were prepared.

In a manner similar to the foregoing illustrations, other polymers are readily employed in accordance with the method of the present invention.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. In a method for the polymerization of an organic monomeric material to a synthetic resinous thermoplastic polymer, the polymer being soluble in the monomeric material, the steps of the method comprising passing the monomeric material into an inlet of an elongate unstirred tubular reactor maintaining the monomeric material within the tubular reactor at a temperature sufficient to induce polymerization of at least a portion of the monomer to form polymer, discharging and recovering polymerized thermoplastic material from the tubular reactor, the improvement which comprises intermittently feeding monomer material to the reactor in quantities not greater than 0.5 reactor volume converting at least 50 percent of the monomer introduced to polymer prior to discharge from the reactor subsequently introducing additional monomer.

2. The method of claim 1 wherein a solvent is present in a quantity of from 0 to 500 percent based on the weight of the monomeric material.

3. The method of claim 2 wherein the solvent is present in a proportion of from 0 to 50 weight percent.

4. The method of claim 1 wherein the monomeric material is polymerized to polymer at a temperature below the melt temperature of the polymer.

5. The method of claim 1 wherein a plurality of tubular reactors are employed, the tubular reactors communicating with a common inlet header.

6. The method of claim 5 wherein the tubular reactors communicate with a common discharge header.

* * * * *